United States Patent Office 3,008,207
Patented Nov. 14, 1961

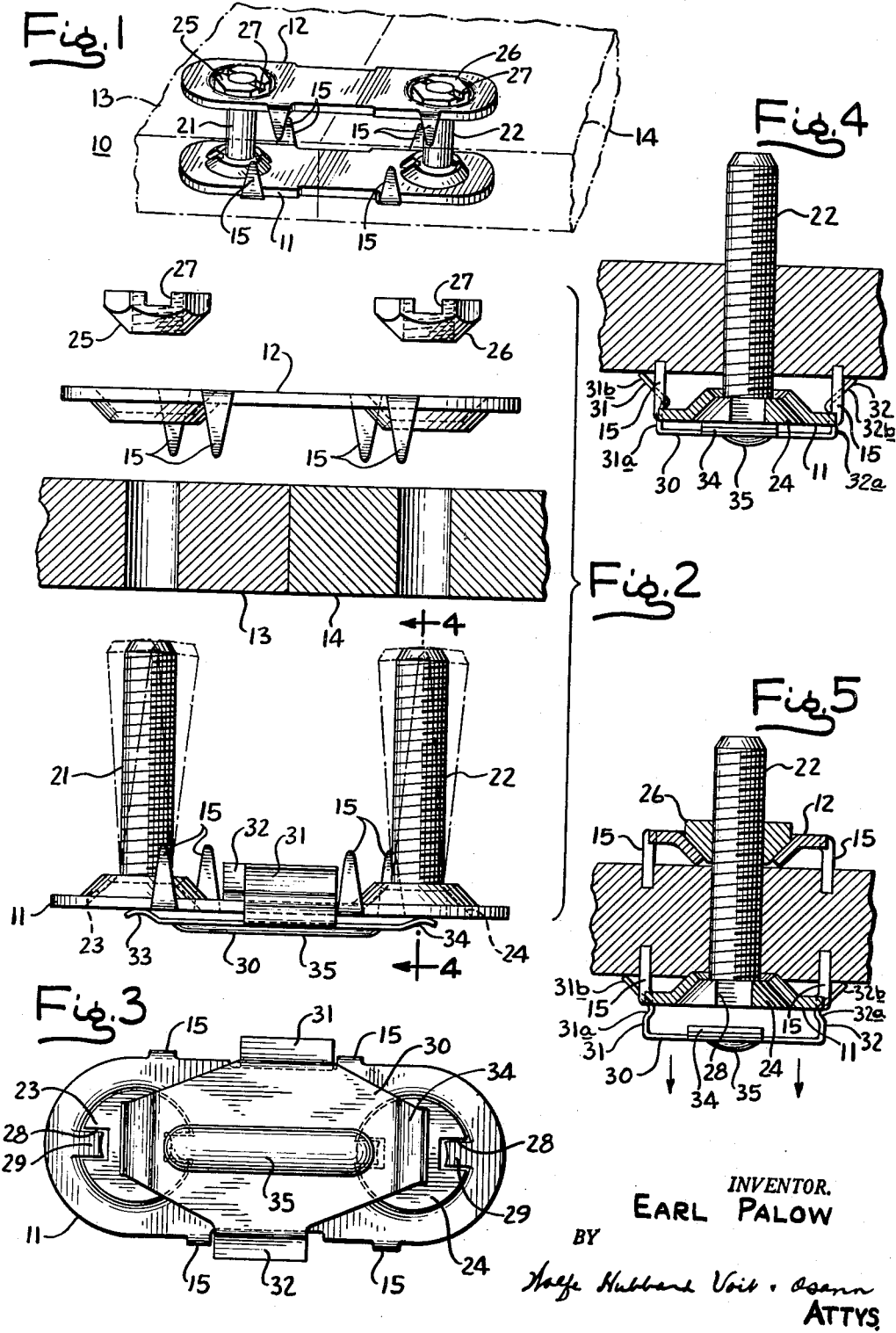

3,008,207
CONVEYOR BELT FASTENER
Earl Palow, Lake Zurich, Ill., assignor to Armstrong-Bray & Company, Chicago, Ill., a corporation of Illinois
Filed June 29, 1959, Ser. No. 823,403
1 Claim. (Cl. 24—37)

The present invention relates to conveyor belt fasteners and more particularly to means for facilitating assembly of the fasteners on the belt.

Conveyor belt fasteners for securing together the two ends of the belt to form a continuous loop commonly consist of a pair of metal clamping plates having through-bolts at the ends which register with holes punched in the ends of the belt. The fasteners are normally used in multiple and spaced closely side by side. In a belt of average width a dozen or more fasteners may be used, with double this number of through-bolts which have to be registered in the holes and then tightened. Installation becomes rather tedious, and the saving of even a few seconds in the installation of a single fastener becomes worthwhile in a plant where many belts are employed and must be kept in constant repair. The problem of installation is worsened by the fact that the through-bolts must be registered with the holes in the belt from below and the operator must therefore work "blind." Getting a pair of snug-fitting bolts to register simultaneously in a thick belt is the problem toward which this invention is specifically directed.

Accordingly it is an object to provide a fastener assembly for a conveyor belt which includes the fastener itself plus a novel clip attachment which temporarily retains the bolts in a rigid right-angled position with respect to the associated fastener plate to facilitate assembly of the fastener on the belt. More specifically it is an object to provide a fastener assembly for a conveyor belt which includes a novel bolt-positioning clip which maintains the bolts in a stiffly upstanding, right-angled position until after the bolts have been telescoped through the holes in the ends of the belt and until after the nuts have been assembled thereon, with the clip being arranged to "pop off" as the nuts are tightened and after the services of the clip are no longer required.

It is a general object of the invention to provide a fastener assembly for a conveyor belt which may be efficiently installed with minimum expenditure of time even under difficult, factory-floor, operating conditions and with the fastener inserted "blind" from below the belt.

Other objects and advantages of the invention become apparent on reading the attached detailed description and upon reference to the drawings which:

FIGURE 1 is a perspective showing a conveyor belt fastener in place on the belt and with the belt indicated by a phantom outline.

FIG. 2 is an exploded side view of a fastener assembly constructed in accordance with the invention, with the bolts in position for registering with holes in the belt.

FIG. 3 is a bottom view of assembly shown in FIG. 2.

FIG. 4 is an end view taken along the lines 4—4 in FIG. 2.

FIG. 5 is a view similar to FIG. 4 but showing the improved clip in the act of "popping-off" as the nuts are tightened.

While the invention has been described in connection with a preferred embodiment, it will be understood that I do not intend to be limited to such embodiment but intend to cover the various alternatives and equivalent constructions included within the spirit and scope of the appended claim.

Referring now to the drawings, FIG. 1 shows a conveyor belt fastener 10 including a bottom clamping plate 11 and a top clamping plate 12, installed in operating position. The ends of the belt, sandwiched between the two clamping plates in abutting relation, are indicated at 13, 14. To insure gripping of the belt the clamping plates are provided with integral points or spurs 15 bent inwardly to engage the belt when the clamping plates are tightened. Extending through holes in the clamping plates and registering with holes in the belt are two bolts 21, 22. These bolts have conical heads 23, 24 respectively and the shanks of the bolts are threadedly engaged by conical nuts 25, 26. For the purpose of engagement by a turning tool, each of the nuts 25, 26 has a transverse slot 27, similar to a screw driver slot, across its top. To prevent rotation of the bolts as the nuts are turned, the bolt heads 23, 24 have lateral notches 28 which register with ears 29 integrally formed in the bottom clamping plate.

To provide conical seats for the bolt heads and the nuts, the lands surrounding the holes in the clamping plates are struck out in the direction of the belt as shown. Nevertheless, the heads of the bolts 21, 22 have a limited ball-and-socket action with respect to the conical seats so that the bolts unless restrained in accordance with the invention are free to rock between the positions indicated by the dotted lines in FIG. 2.

However, in carrying out the invention a temporary clip is provided as part of the assembly which is capable of concentrating force along the bolt axis as long as the clip is in place, thereby to center the bolts in a stiff, centered or right-angled position for registering with the holes provided in the conveyor belt. In the present instance the clip indicated at 30 has side snap members or detents 31, 32 which snap over the lateral edges of the lower clamping plate for maintaining it in place. In addition the clip 30 is provided with tips 33, 34 which are offset from the body of the clip to apply localized force to the bolt heads concentrated along the bolt axis. As will be apparent from the drawings, the body of the clip 30 is substantially flat, and may be reinforced by a shallow embossment 35 which runs the length of the clip. The tips 33, 34 are formed integrally with the body by bending the ends of the body out of the plane of the body and into shallow arcs as shown. With the tips in contact with the bolt heads, the body of the clip is held slightly spaced from the clamping plate which insures that all of the force is concentrated at the centers of the bolt heads. Preferably the side detents extend along only a fraction of the length of the clip, and the body of the clip is somewhat resilient so that there tends to be equalization of the forces applied axially to the two bolt heads.

Turning more specific attention to the side detents 31, 32 (see FIG. 4), it will be noted that each of the detents includes a grasping portion as indicated at 31a, 32a, and an outwardly flaring wing portion 31b, 32b. The fasteners are furnished by the manufacturer completely assembled with the clips in place as shown in FIGS. 2, 3 and 4 holding the bolts in positions. The grasping force provided by the detents is sufficiently strong so that appreciable centering force is concentrated at the bolt heads, and appreciable dislodging force must be applied to get the clip off of the clamping plate. As has been clearly illustrated in FIGS. 2 and 3, detent 31 is positioned adjacent spur 15 on one side of the assembly and detent 32 is positioned adjacent the diagonally opposite spur 15 on the opposite side thereof, thus inherently preventing longitudinal movement of the clip 30.

Thus when it is desired to assemble a fastener in a conveyor belt, the latter having been punched with holes of proper diameter and spacing, the operator simply removes one of the assemblies from the box and holds it in the palm of his hand under the belt and with the bolts projecting upwardly as shown in FIG. 2. Because of the centering action of the clip and the force axially provided on the bolt head, each of the bolts is held stiffly upright with the tips of the bolts maintained at the exact spacing from one another as to register with the spacing of the holes in the belt. Consequently, the assembly can be thrust upwardly toward the belt with the assurance that the tips of the bolts will simultaneously enter the holes provided without any fumbling, keeping in mind that the operator must, during this process, work "blind" with the assembly out of his line of sight. Prompt simultaneous register of the tips of the bolts with the holes is extremely important since if only one of the bolts should register with a hole and not the other, any attempt to move the assembly upwardly simply bottoms the tip of the non-registered bolt against the lower side of the belt, with the result that both the bolt and the retaining clip 30 will be dislodged and fall to the floor.

After the bolts have been inserted into the belt to the point where their tips project above the upper surface of the belt, as shown in FIG. 4, the top clamping plate is seated in registering position and the nuts 25, 26 are lightly screwed in place with the finger tips. The wing portions of the detents 31, 32 under such conditions lightly contact the underside of the belt. Next, a turning tool is applied to the nuts which pulls the lower clamping plate upwardly as shown in FIG. 5. The upward force applied to the lower clamping plate springs the same loose from the clip. Prompt release of the clip when it is no longer required is facilitated by the outward flare of the wing portions 31b, 32b of the detents, which exert a prying-off effect upon the gripping portions 31a, 32a, so that the clip "pops off" and falls to the floor without any care or attention on the part of the operator. After the nuts 25, 26 have been screwed tight in their conical seats, the projecting ends of the bolts may be cut off flush with the surface of the top clamping plate.

The entire operation takes only a few seconds and may be reduced to three basic moves; the upward insertion of the stiffly upstanding bolts through the holes, the assembly of top plate and nuts, and the screwing tight, the total process taking less than half of the time than when employing fasteners of conventional design.

The clip assemblies may be machine-assembled at the factory. It will be apparent that the cost of the retaining clip forms a small percentage of the total cost of the assembly, being far outweighed by the advantages gained.

I claim as my invention:

A fastener assembly for conveyor belts which comprises, in combination, lower and upper clamping plates having registering holes at the ends thereof, said clamping plates having integral spurs bent inwardly to engage the belt, conically headed bolts seated in the holes in the lower clamping plate, a temporary bolt-retaining clip member having detents for clipping the same onto said lower clamping plate, each of said detents being positioned to abut at least one of said spurs to thereby prevent longitudinal movement of said clip member, said clip member having deformed tip portions at its ends which are offset from the body of the clip member at points alined with the bolt axes so that concentrated pressure is exerted by the clip member at the centers of the bolt heads thereby to center the bolts in stiff, right-angled positions in said lower clamping plate to facilitate insertion of the tips of the bolts into registering holes in the belt, nuts on said bolts, and means for dislodging the clip member incident to tightening the nuts, said clip member having upwardly projecting portions which engage the underside of the belt as the lower clamping plate is drawn into seated position on the belt for dislodgment of the clip member.

References Cited in the file of this patent

UNITED STATES PATENTS 1,659,001     Purple _____ Feb. 14, 1928